(12) United States Patent
Wagner et al.

(10) Patent No.: US 10,714,050 B2
(45) Date of Patent: Jul. 14, 2020

(54) REDUCING LATENCY IN AUGMENTED REALITY (AR) DISPLAYS

(71) Applicant: DAQRI, LLC, Los Angeles, CA (US)

(72) Inventors: Daniel Wagner, Vienna (AT); Igor Komir, Spicewood, TX (US); Dominik Schnitzer, Vienna (AT); Alex Feinman, San Mateo, CA (US); Heinrich Fink, Vienna (AT)

(73) Assignee: DAQRI, LLC, Los Angeles, CA (US)

( * ) Notice: Subject to any disclaimer, the term of this patent is extended or adjusted under 35 U.S.C. 154(b) by 128 days.

(21) Appl. No.: 15/927,187

(22) Filed: Mar. 21, 2018

(65) Prior Publication Data
US 2019/0295496 A1  Sep. 26, 2019

(51) Int. Cl.
| | |
|---|---|
| *G09G 5/00* | (2006.01) |
| *G06T 19/00* | (2011.01) |
| *G06F 3/01* | (2006.01) |
| *G06F 3/147* | (2006.01) |
| *G09G 5/02* | (2006.01) |
| *G09G 5/36* | (2006.01) |

(52) U.S. Cl.
CPC ............. *G09G 5/005* (2013.01); *G06F 3/012* (2013.01); *G06F 3/147* (2013.01); *G06T 19/006* (2013.01); *G09G 5/006* (2013.01); *G09G 5/02* (2013.01); *G09G 5/363* (2013.01); *G09G 2310/0235* (2013.01); *G09G 2360/02* (2013.01); *G09G 2360/18* (2013.01)

(58) Field of Classification Search
CPC .... G09G 5/005; G09G 5/006; G09G 2360/02; G06F 3/012; G06T 19/006
See application file for complete search history.

(56) References Cited

U.S. PATENT DOCUMENTS

| | | | |
|---|---|---|---|
| 10,339,850 B2* | 7/2019 | Greer, III | G09G 3/001 |
| 2014/0292803 A1* | 10/2014 | Cook | G06T 15/00 |
| | | | 345/619 |
| 2017/0018121 A1 | 1/2017 | Lawson et al. | |
| 2018/0053284 A1* | 2/2018 | Rodriguez | G06F 3/14 |
| 2018/0061121 A1* | 3/2018 | Yeoh | G06T 15/005 |

FOREIGN PATENT DOCUMENTS

WO  WO-2014105646 A1  7/2014

OTHER PUBLICATIONS

"European Application Serial No. 19163859.2, Extended European Search Report dated Aug. 19, 2019", 8 pgs.

* cited by examiner

*Primary Examiner* — Bryan Earles
(74) *Attorney, Agent, or Firm* — Schwegman Lundberg & Woessner, P.A.

(57) ABSTRACT

Disclosed are systems, methods, and non-transitory computer-readable media for reducing latency in augmented reality displays. A display controller receives, from a GPU, a stream of image pixels of a frame of virtual content to be presented on a display of a display device. The stream of image pixels is received via a high-speed bulk interface that transfers data at least as fast as can be consumed by the display. As the stream of image pixel is received, the display controller converts each respective image pixel from a data format used to transmit the stream of image pixels via the high-speed bulk interface to a data format that is compatible for display by the display. Each converted image pixel is stored in a pixel cell of the display, after which the frame is presented on the display.

17 Claims, 7 Drawing Sheets

REDUCING LATENCY IN AUGMENTED REALITY (AR) DISPLAYS

TECHNICAL FIELD

An embodiment of the present subject matter relates generally to augmented reality (AR) and, more specifically, to reducing latency in AR displays.

BACKGROUND

Augmented reality (AR) systems present virtual content to augment a user's real world environment. For example, virtual content overlaid over a physical object can be used to create the illusion that the physical object is moving, animated, etc. An augmented reality device worn by a user continuously updates presentation of the virtual content based on the user's movements to create the illusion that the virtual content is physically present in the user's real world environment. For example, as the user moves their head, the augmented reality device updates presentation of the virtual content to create the illusion that the virtual content remains in the same geographic position within the user's real world environment. Accordingly, a user may move around a virtual object presented by the augmented reality device in the same way the user would a physical object.

One problem with implementing augmented reality is latency associated with presenting virtual content. To convincingly create the illusion that the virtual object is in the user's real world environment, the augmented reality device has to update presentation of the virtual object almost instantaneously. Any perceivable latency in doing so diminishes the user's experience. As the user moves the augmented reality device, the user's view of the real world environment changes instantaneously. The virtual content takes a longer time to change because the augmented reality device has to process the environmental data with the Inertial Measurement Unit (IMU) data, render the virtual content, and project the virtual content in front of the user's field of view. This latency causes the virtual content to appear jittery or lagging, which diminishes the user's augmented reality experience. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
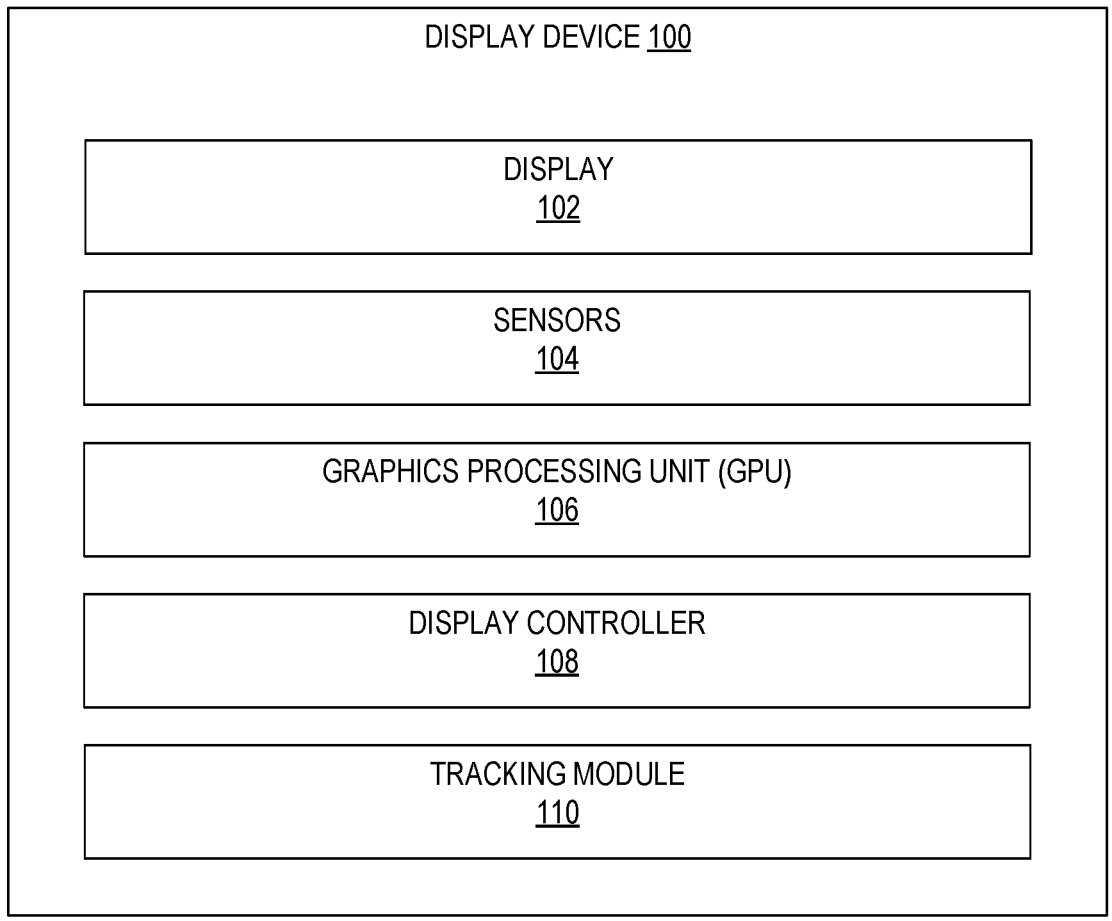
FIGS. 1A and 1B show a display device configured to reduce latency when presenting AR content, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for reducing latency in augmented reality displays. A display device, such as a head mounted display device, presents virtual content on a display of the display device to augment a user's reality. In some implementations, the display is a transparent display positioned in the user's line-of sight when the user is wearing the display device, thereby allowing the user to simultaneously view both virtual content presented on the display, as well as real-world objects visible in the user's line-of-sight. As a result, the user's reality is augmented by the virtual content presented on the display. That is, the virtual content appears to be physically present in the user's real world environment as the user looks through the display.

To maintain the illusion that the virtual content is present in the user's real world environment, the display device updates presentation of the virtual content on the display in response to detected movements of the user. For example, presentation of the virtual content is updated to create the illusion that the virtual content remains in the same physical location as the user moves. Accordingly, the display device may adjust the presentation (e.g., size and/or position) of the virtual content on the display in response to detected movements of the user.

The display device preferably updates presentation of the virtual content at a rate that is consistent with the movements of the user, as any detectable latency may diminish the user's AR experience. To this end, the display device reduces actual latency associated with transferring video data to the display, as well as perceived latency by warping frames of virtual content based on updated three-dimensional pose data. The display device includes a Graphics Processing Unit (GPU) that renders virtual content, which is then transferred to the display where it is displayed for the user. The display device uses a display that includes pixel cells, such as an LCOS display panel. Each pixel cell is a memory element that stores a pixel value for the duration of a frame. The display device displays an image by modulating a source of light, which illuminates the entire display panel. Accordingly, the display device illuminates each frame after the entire frame (i.e., each pixel of the frame) has been received by the display and stored into the pixel cells.

Traditionally, image data is transferred using standard video interfaces, such as HDMI, DisplayPort, MIPI DSO, LVDS, SDI, etc. These standard video interfaces are isochronous, meaning that an entire frame is sent at a rate defined by the video resolution and frame rate. Although transmitting data using a standard video interface may be adequate for certain applications, the rate at which standard video interfaces transfer data may lead to undesirable latency when providing an AR experience. To minimize latency associated with transferring data from the GPU to the display, the display device uses a high-speed bulk interface, rather than a standard video interface. A high-speed bulk interface, such as PCI Express, Thunderbolt, USB SS, etc., transfers data at a rate that is much faster than the rate provided by a standard video interface, and is at least as fast as can be consumed by the display.

Whether using a standard video interface or a high-speed bulk interface to transmit image data, the image data is transmitted in a format that is not compatible with a display. This means that the display may not be able to present a rendered frame in the data format in which the rendered frame is received from the GPU. Accordingly, a display controller positioned as an intermediary between the GPU and the display, receives the image data transferred from the GPU and converts the received image data into a format that is compatible with the display. Traditional display controllers used with standard video interfaces require that at least a portion of the frame be buffered at the traditional display controller prior to the image data (i.e., image pixels) being converted into a format that is compatible with the display. In contrast, the display controller used with a high-speed bulk interface allows for the image data to be converted as it is received from the GPU, without having to wait for any portion of the frame to first buffer. Accordingly, the display controller converts the image data (i.e., image pixels) as it is received from the GPU, and writes each converted image pixel to the display as it is converted. Converting the data as it flows from the GPU to the display, rather than after the entire or portion of the frame is buffered by the display controller, minimizes latency.

In addition to reducing latency associated with transferring data to the display, the display device also reduces perceived latency by warping the frame prior to the frame being displayed. The GPU renders each frame of the virtual content based on sensor data describing a three-dimensional pose of the display device. The three-dimensional pose indicates an orientation and position of the display device in a three-dimensional environment. The GPU uses the three-dimensional pose to generate frames of the virtual content that account for the user's movements. Some latency exists between the time a frame is rendered by the GPU and displayed to the user. During this time a user's position may change, particularly if the user is moving quickly. Accordingly, the rendered frame may be outdated when it is displayed by the display. This problem is exasperated using a display such as a LCOS display that presents each frame separately in three different colors (i.e., red, blue and green). To alleviate this issue, the display controller warps each frame based on updated sensor data gathered by the display controller as each frame is received from the GPU. Warping the frame adjusts the rendered frame to account for the updated movements of the user after the frame was rendered. The display controller warps the image pixels of the frame as they are received from the GPU, rather than after the entire frame is received from the GPU, thereby minimizing latency.

Figure 1B:
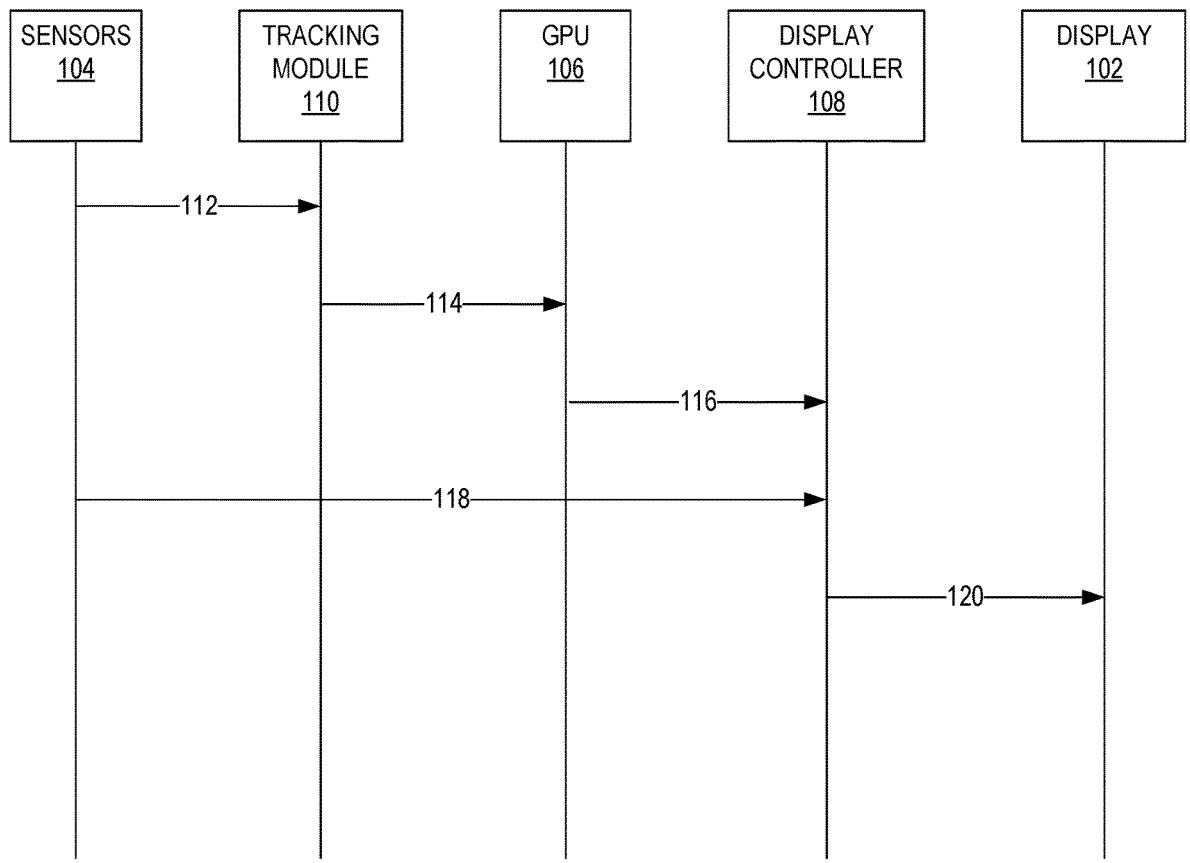

FIGS. 1A and 1B show a display device 100 configured to reduce latency when presenting AR content, according to some example embodiments. To avoid obscuring the inventive subject matter with unnecessary detail, various functional components (e.g., modules) that are not germane to conveying an understanding of the inventive subject matter have been omitted from FIGS. 1A and 1B. However, a skilled artisan will readily recognize that various additional functional components may be supported by the display device 100 to facilitate additional functionality that is not specifically described herein. For example, the display device may include some or all of the features, components, and peripherals of the machine 600 shown in FIG. 6. Furthermore, the various functional components depicted in FIGS. 1A and 1B may reside on a single computing device or may be distributed across several computing devices in various arrangements such as those used in cloud-based architectures.

FIG. 1A is a block diagram of a display device 100 configured to reduce latency when presenting AR content, according to some example embodiments. As shown, the display device 100 includes a display 102, sensors 104, a GPU 106, a display controller 108, and an image rendering module 110. The display device 100 presents virtual content to augment a user's reality. For example, the GPU 106 renders virtual content that is displayed on the display 102, such that the virtual content overlaps physical objects in the user's real world environment. This can include either presenting the virtual content over captured images of the user's real world environment or presenting the virtual content on a transparent display.

The sensors 104 include an optical sensor, such as a camera, that capture images of the user's real world environment. In some embodiments, the display device 100 presents the captured images of the user's real world environment on the display 102 along with the virtual content rendered by the GPU 106. The virtual content is presented over the images of the user's real world environment to create the illusion that the virtual content exists in the user's real world environment, thereby augmenting the user's reality.

In some embodiments, the display 102 is a transparent display that allows a user to simultaneously view real world physical object that are visible through the display 102 and virtual content presented on the display 102. In this type of embodiment, the user views their real world environment through the display to view the virtual content overlaid over the user's real world environment. For example, the display device 100 may be a wearable device, such as a head mounted device, that positions the display 102 in the user's line-of-sight when the display device 100 is worn by the user. Accordingly, virtual content presented on the display 102 appears in the user's line-of-sight while the display device is being worn by the user.

In either case, the display 102 includes multiple pixel cells arranged in matrix form. Each individual pixel cell is a memory element that stores a pixel value for the duration of a frame. The display controller 108 manages presentation of images by the display 102. The display controller 108 causes the display 102 to display an image by modulating a source of light, which illuminates the entire display panel. The display controller 108 causes the display 102 to illuminate each frame after the entire frame (i.e., each pixel of the frame) has been received by the display 102 and is stored into the pixel cells. In some embodiments, the display 102 is an LCOS display panel.

The GPU 106 renders frames of the virtual content based on a three-dimensional pose of the display device 100. The three-dimensional pose of the display device 100 indicates an orientation and position of the display device 100 in a three-dimensional environment. The three-dimensional pose of the display device 100 is determined by the tracking module 110 based on sensor data gathered by the sensors 104. The sensors 104 include any type of sensor that gathers data describing the real world environment surrounding the display device 100 and/or a position of the display device 100 in relation to the real world environment surrounding the display device 100. For example, the sensors 104 may include a gyroscope, camera, motion sensors, Inertial Measurement Unit (IMU), depth sensor, thermal sensor, etc.

The tracking module 110 gathers sensors data from the sensors 104 and uses the sensor data to determine the three-dimensional pose of the display device 100. The three-dimensional pose is a determined orientation and position of the display device 100 in relation to the user's real world environment. For example, the tracking module 110 may use images of the user's real world environment, as well as other sensor data to identify a relative position and orientation of the display device 100 from physical objects in the real world environment surrounding the display device 100. The tracking module 110 continually gathers and uses updated sensor data describing movements of the display device 100 to determine updated three-dimensional poses of the display device 100 that indicate changes in the relative position and orientation of the display device 100 from the physical objects in the real world environment.

The tracking module 110 provides the three-dimensional pose of the display device to the GPU 106. The GPU 106 uses the three-dimensional pose of the display device 100 to generate frames of virtual content to be presented on the display 102. For example, the GPU 106 uses the three-dimensional pose to render a frame of the virtual content such that the virtual content is presented at an appropriate orientation and position on the display to properly augment the user's reality. As an example, the GPU 106 may use the three-dimensional pose data to render a frame of virtual content such that, when presented on the display 102, the virtual content overlaps with a physical object in the user's real world environment. The GPU 106 generates updated frames of virtual content based on updated three-dimensional poses of the display device 100, which reflect changes in the position and orientation of the user in relation to physical objects in the user's real world environment.

The GPU 106 stores each rendered frame to a frame buffer (not shown) of the GPU 106, after which the frame is transferred to the display controller 108. Traditional system transfer image data using standard video interfaces, such as HDMI, DisplayPort, MIPI DSO, LVDS, SDI, etc. These standard video interfaces are isochronous, meaning that an entire frame is sent at a rate defined by the video resolution and frame rate. Although standard video interface may work in certain applications, the rate at which they transfer data may lead to undesirable latency when providing an AR experience. To increase the speed at which the frame is transferred, the display device 100 uses a high-speed bulk interface to transfer the frame from the frame buffer of the GPU 106 to the display 102. A high-speed bulk interface, such as PCI Express, Thunderbolt, USB SS, etc., transfers data at a rate that is much faster than provided by a standard video interface, and is at least as fast as can be consumed by the display.

Whether using a standard video interface or a high-speed bulk interface to transmit image data, the image data is transmitted in a format that is not compatible with a display 102. This means that the display 102 may not be able to present a rendered frame in the data format in which the rendered frame is received from the GPU 106. Accordingly, a display controller 108 positioned as an intermediary between the GPU 106 and the display 102, receives the image data transferred from the GPU 106 and converts the received image data into a format that is compatible with the display 102. Traditional display controllers used with standard video interfaces require that at least a portion of the frame be buffered at the traditional display controller prior to the image data (i.e., image pixels) being converted into a format that is compatible with the display 102. In contrast, the display controller 108 used with a high-speed bulk interface allows for the image data to be converted as it is received from the GPU 106, without having to wait for any portion of the frame to first buffer. Accordingly, the display controller 108 converts the image data (i.e., image pixels) as it is received from the GPU 106, and writes each converted image pixel to the display 102 as it is converted. Converting the data as it flows from the GPU 106 to the display 102, rather than after the entire or portion of the frame is buffered by the display controller 108, minimizes latency.

The display controller 108 converts the image data (i.e., image pixels) as it is received from the GPU 106, and then writes each converted image pixel to the display 102 as they are converted. For example, the display controller 108 writes each converted image pixel to a pixel cell of the display 102. Converting the image data as it flows from the GPU 106 to the display 102, rather than after the entire frame is received from the GPU 106, minimizes latency.

A display 102, such as an LCOS display, presents each frame of virtual content in multiple presentations. Each presentation of a frame includes a distinct subset of the image pixels of the frame, in which each pixel is a single color. For example, the LCOS display first presents a subset of the frame that includes only the red pixels of the frame, followed by a subset of the frame that includes the blue pixels of the frame, and then a subset of the frame that includes the green pixels of the frame. The GPU 106 splits each rendered frame into subsets of the frame based on the color of the pixels, and then transmits each subset of the frame to the display 102 separately. Accordingly, each subset of the frame (i.e., the image pixels in each subset of the frame) is transmitted to the display controller 108, where the image pixels are converted into a format compatible with the display 102, and stored into the pixel cells of the display 102 for presentation.

As explained above, the display controller 108 causes the display 102 to display each frame by modulating a source of light, which illuminates the entire display panel. The display controller 108 causes each frame to be illuminated after the entire frame (i.e., each pixel of the frame) has been converted and written to the display 102.

To reduce perceived latency, the display controller 108 may warp a frame prior to the frame being displayed on the display 102. As explained earlier, the GPU 106 renders each frame of the virtual content based on a three-dimensional pose of the display device 100. Some latency exists from the time the tracker module 110 determines the three-dimensional pose, the frame is rendered by the GPU 106 and ultimately displayed to the user on the display 102. During this time, a user's position may change, particularly if the user is moving quickly. Accordingly, the rendered frame may be outdated when it is presented. This problem is exasperated using a display 102 such as a LCOS display that presents each frame separately in three different colors (i.e., red, blue and green). To alleviate this issue, the display controller 108 warps the pixels cells of each frame prior to presentation based on updated sensor data gathered from the sensors 104. Warping the frame adjusts the rendered frame to account for the updated movements of the user.

To accomplish this, the display controller 108 gathers sensor data, such as sensor data gathered from an IMU sensor (e.g., gyroscope data and accelerometer data), and uses the gathered sensor data to determine an updated three-dimensional pose of the display device 100. The display controller 108 then warps the frame based on the updated three-dimensional pose of the display device 100 to correct the frame to account for rotations or other movements of the display device 100 after the frame was rendered by the GPU 106.

The display controller 108 warps the image pixels of a frame as the image pixels are received by the display controller 108 from the GPU 106. For example, the display controller 108 gathers the updated sensor data and determines the updated three-dimensional pose as each frame is transferred from the GPU 106. The display controller 108 then warps the pixels of the frame as they are received from the GPU 106 based on the updated three-dimensional pose of the display device 100. The display controller 108 warps the image pixels in addition to converting the image pixels into a data format that is compatible with the display 102. After an image pixel is converted and warped, the display controller 108 stores the image pixel into a pixel cell of the display 102.

Warping the image pixels of each frame as they are received from the GPU 106 provides the benefits of reduced latency, and warping each subset of a frame individually based on updated sensor data. As explained above, the GPU 106 splits each rendered frame into subsets of the frame based on the color of the pixels, and then transmits each subset of the frame to the display 102 separately to be displayed. The display controller 108 gathers updated sensor data and determines an updated three-dimensional pose of the display device 100 as each of the subsets is received by the display controller 108, and warps each subset according to an updated three-dimensional pose determined. As a result, a first subset of the pixels of the frame that includes only green pixels is warped based on an updated three-dimensional pose of the display device 100 determined as the first subset of pixels of the frame is received by the display controller 108, whereas a second subset of the pixels of the frame that includes only blue pixels is warped based on an updated three-dimensional pose of the display device 100 determined as the second subset of the pixels of the frame is received by the display controller 108. Accordingly, each subset of the frame is warped individually and based on a most recent three-dimensional pose determined when the respective subset of the frame is received by the display controller 108.

FIG. 1B is a flow diagram of a display device 100 configured to reduce latency when presenting AR content, according to some example embodiments. As shown, the sensors 104 provide sensor data 112 to the tracking module 110. The sensor data 112 includes data gathered from multiple sensors of the display device 100, such as optical sensors (e.g., camera), motion sensors (e.g., gyroscope, accelerometer, IMU), depth sensors, thermal sensors, etc. The tracking module 110 uses the received sensor data 112 to determine a three-dimensional pose of the display device 100.

The tracking module 110 provides the three-dimensional pose 114 to the GPU 106. The GPU 106 uses the three-dimensional pose 114 to render a new frame of the virtual content based on the three-dimensional pose 114 of the display device 100.

The GPU 106 initially writes the new frame to a frame buffer of the GPU 106, after which the rendered frame is transmitted 116 to the display controller 108. To increase the speed at which the rendered frame is transmitted to the display controller 108, a high-speed bulk interface, such as PCI Express, Thunderbolt, USB SS, etc., is used in place of a standard video interface. A high-speed bulk interface transfers data at a rate that is much faster than provided by a standard video interface, and is at least as fast as can be consumed by the display 102.

Using a high-speed bulk interface to transfer data, rather than a standard video interface, eliminates the need for any portion of the frame to be buffered by the display controller 108 prior to the image pixels being converted. Accordingly, the display controller 108 converts the rendered frame received from the GPU 106 into a data format that is compatible with the display 102 as they are received by the display controller 108, rather than waiting for the entire frame or a portion of the frame to be received.

In addition to converting the rendered frame into a data format that is compatible with the display 102, the display controller 108 also warps each frame based on an updated three-dimensional pose of the display device 100. As shown, the display controller 108 receives updated sensor data 118 from the sensors 104. The updated sensor data can include sensor data gathered from an IMU (e.g., gyroscope data and accelerometer data). The display controller 108 uses the gathered sensor data to determine an updated three-dimensional pose of the display device 100. The display controller 108 then warps the frame based on the updated three-dimensional pose of the display device 100 to correct the frame to account for rotations or other movements of the display device 100 after the frame was rendered by the GPU 106.

As with converting the format of the rendered frame, the display controller 108 warps the image pixels of the frame as they are received by the display controller 108, rather than waiting for the entire frame to be received from the GPU 106. Once an image pixel has been converted into a data format that is compatible with the display 102 and warped based on the updated three-dimensional pose of the display device 100, the display controller 108 writes the image pixel 120 to a pixel cell of the display 102. In this way, the display controller 108 acts as intermediary between the GPU 106 and the display 102, and processes the image pixels (i.e., converts and warps the image pixels), as they are transmitted from the GPU 106 to the display 102.

The display 102 presents each frame after each of the pixel cells of the frame has been written to the display 102. The frame is presented by modulating a source of light, which illuminates the entire display panel.

Figure 2:
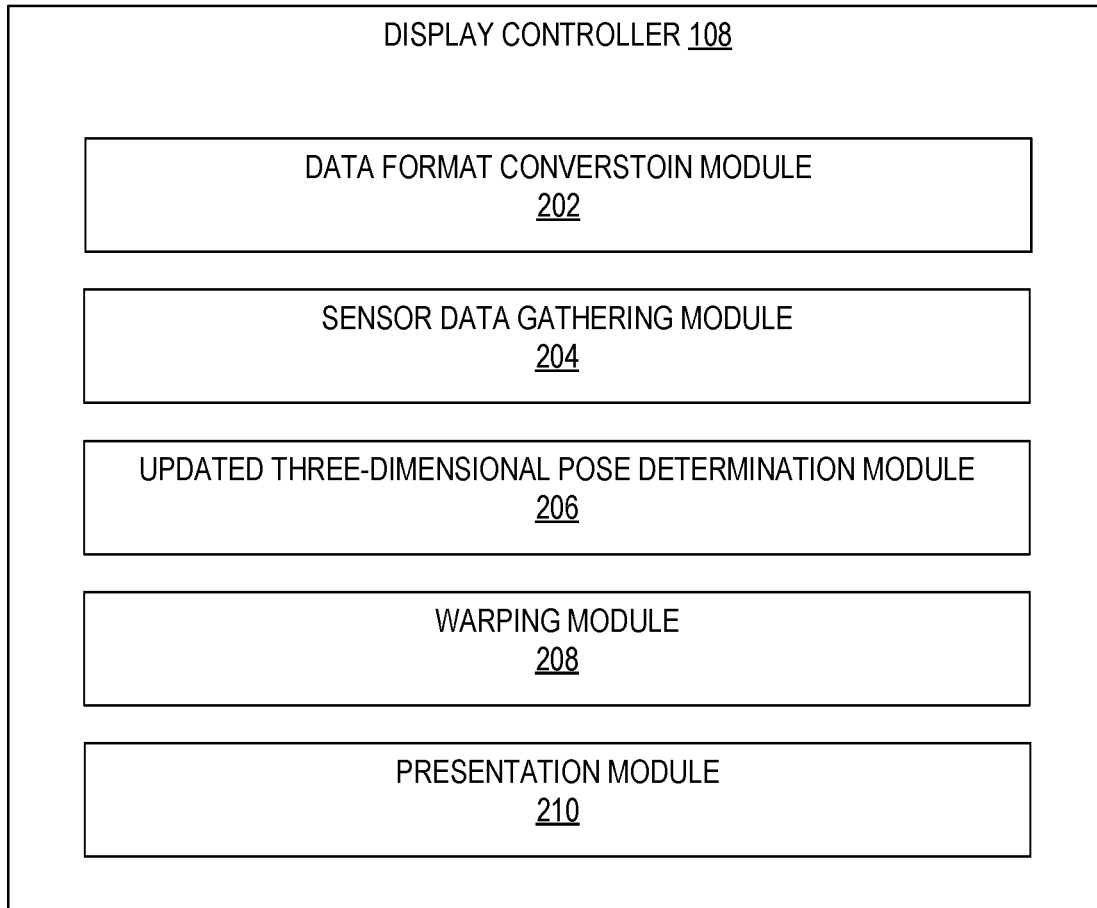
FIG. 2 is a block diagram of the display controller, according to some example embodiments.

FIG. 2 is a block diagram of the display controller 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the display controller 108 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the display controller 108 includes a data format conversion module 202, a sensor data gathering module 204, an updated three-dimensional pose determination module 206, a warping module 208, and a presentation module 210. The data format conversion module 202 converts data pixels into a data format that is compatible with the display 102. A rendered frame is transmitted to the display controller 108 from the GPU 106 using a high-speed bulk interface. Using the high-speed bulk interface increases the speed at which the rendered frame is transmitted, as opposed to using a standard video interface. To use the high-speed bulk interface, the frame is transmitted in a data format that is compatible for use with the high-speed bulk interface. This data format may not be compatible with the display 102. To alleviate this issue, the data format conversion module 202 converts each data pixel of the frame from the data format used to transmit via the high-speed bulk interface into a data format that is compatible with the display. The data format conversion module 202 converts each data pixel as it is received from the GPU 106, rather than waiting for the entire frame or a portion of the frame to be received by the GPU 106, as when using a standard video interface.

The sensor data gathering module 204 gathers updated sensor data from the sensors 104 of the viewing device 100. The updated sensor data may include gyroscope and accelerometer data gathered from an IMU sensor. The sensor data gathering module 204 may gather the updates sensor data as each new frame is transmitted to the display controller 108 from the GPU 106.

The updated three-dimensional pose determination module 206 uses the updated sensor data gathered by the sensor data gathering module 202 to determine an updated three-dimensional pose of the display device 100. The updated three-dimensional pose indicates an updated orientation and position of the display device 100. The sensor data gathering module 202 provides the updated three-dimensional pose to the warping module 208.

The warping module 208 warps the rendered frame based on the updated three-dimensional pose of the display device 100. Warping the frame modifies the rendered frame by slightly distorting the frame to account for the change in the three-dimensional pose of the viewing device 100. Accordingly, the warping module 208 performs a two-dimensional to two-dimensional operation, as opposed to a three-dimensional to two-dimensional operation as performed by the GPU 106 to render the frame. Warping the frame corrects the frame to account for rotations or other movements of the display device 100 after the frame was rendered by the GPU 106.

The warping module 208 warps the image pixels of the frame as they are received by the display controller 108, rather than waiting for the entire frame to be received from the GPU 106. Once an image pixel has been converted into a data format that is compatible with the display 102 and warped based on the updated three-dimensional pose of the display device 100, the display controller 108 writes the image pixel 120 to a pixel cell of the display 102. In this way, the display controller 108 acts as intermediary between the GPU 106 and the display 102, and processes the image pixels (i.e., converts and warps the image pixels), as they are transmitted from the GPU 106 to the display 102.

The presentation module 210 causes the frame to be presented by the display 102 after the entire frame (i.e., each image pixel of the frame) is written to the display 102. For example, the presentation module 210 causes the frame to be presented by modulating a source of light, which illuminates the entire display panel.

Figure 3:
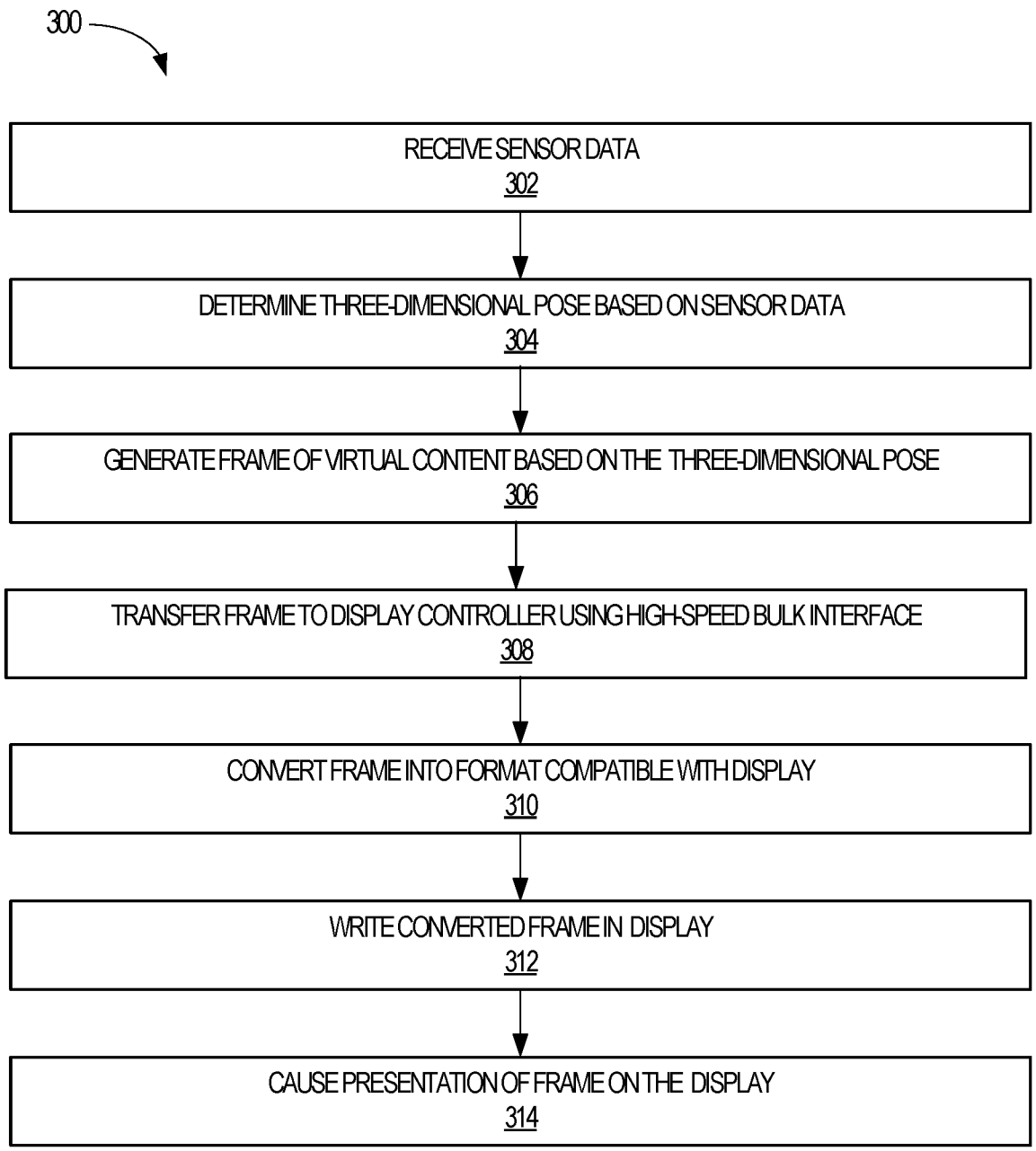
FIG. 3 is a flowchart showing a method for reducing latency when presenting AR content, according to some example embodiments.

FIG. 3 is a flowchart showing a method 300 for reducing latency when presenting AR content, according to some example embodiments. The method 300 may be embodied in computer readable instructions for execution by one or more computer processors such that the operations of the method 300 may be performed in part or in whole by the display device 100; accordingly, the method 300 is described below by way of example with reference thereto. However, it shall be appreciated that at least some of the operations of the method 300 may be deployed on various other hardware configurations and the method 300 is not intended to be limited to the display device 100.

At operation 302, the tracking module 110 receives sensor data from the sensors 104 of the display device 100. The sensors 104 include any type of sensor that gathers data describing the real world environment surrounding the display device 100 and/or a position of the display device 100 in relation to the real world environment surrounding the display device 100. For example, the sensors 104 may include a gyroscope, motion sensor (IMU, accelerometer, gyroscope), camera, depth sensors, thermal sensor, etc.

At operation 304, the tracking module 110 determines a three-dimensional pose of the display device 100 based on the sensor data. The three-dimensional pose is a determined orientation and position of the display device 100 in relation to the user's real world environment. For example, tracking module 110 may use images of the user's real world environment, as well as other sensor data to identify a relative position and orientation of the display device 100 from physical objects in the real world environment. The tracking module 110 continually gathers and uses updated sensor data describing movements of the display device 100 to determine updated three-dimensional poses of the display device 100 that indicate changes in the relative position and orientation of the display device 100 from the physical objects in the real world environment.

At operations 306, the GPU 106 generates a frame of virtual content based on the three-dimensional pose. For example, the GPU 106 uses the three-dimensional pose to render a frame of the virtual content such that the virtual content is presented at an appropriate orientation and position on the display to properly augment the user's reality. As an example, the GPU 106 may use the three-dimensional pose data to render a frame of virtual content such that, when presented on the display 102, the virtual content overlaps with a physical object in the user's real world environment. The GPU 106 generates updated frames of virtual content in response to changes in the position and orientation of the user in relation to physical objects in the user's real world environment.

The GPU 106 stores each rendered frame to a frame buffer of the GPU 106, after which, at operation 308, the frame is transferred to the display controller 108. Traditional systems transfer image data using standard video interfaces, such as HDMI, DisplayPort, MIPI DSO, LVDS, SDI, etc. These standard video interfaces are isochronous, meaning that an entire frame is sent at a rate defined by the video resolution and frame rate. Although standard video interface may work in certain applications, the rate at which they transfer data may lead to undesirable latency when providing an AR experience. To increase the speed at which the frame is transferred, the display device 100 uses a high-speed bulk interface to transfer the frame from the frame buffer of the GPU 106 to the display controller 108. A high-speed bulk interface, such as PCI Express, Thunderbolt, USB SS, etc., transfers data at a rate that is much faster than provided by a standard video interface, and is at least as fast as can be consumed by the display.

Whether using a standard video interface or a high-speed bulk interface to transmit image data, the image data is transmitted in a format that is not compatible with a display 102. This means that the display 102 may not be able to present a rendered frame in the data format in which the rendered frame is received from the GPU 106. Accordingly, a display controller 108 positioned as an intermediary between the GPU 106 and the display 102, receives the image data transferred from the GPU 106 and converts the received image data into a format that is compatible with the display 102. Traditional display controllers used with standard video interfaces require that at least a portion of the frame be buffered at the traditional display controller prior to the image data (i.e., image pixels) being converted into a format that is compatible with the display 102. In contrast, the display controller 108 used with a high-speed bulk interface allows for the image data to be converted as it is received from the GPU 106, without having to wait for any portion of the frame to first buffer. Accordingly, the display controller 108 converts the image data (i.e., image pixels) as it is received from the GPU 106, and writes each converted image pixel to the display 102 as it is converted. Converting the data as it flows from the GPU 106 to the display 102, rather than after the entire or portion of the frame is buffered by the display controller 108, minimizes latency.

The display controller 108 converts the image data (i.e., image pixels) as each image pixel is received from the GPU 106, and then, at operation 312, writes the converted image pixels to the display 102 as they are converted. For example, the display controller 108 writes each converted image pixel to a pixel cell of the display 102. Converting the image data as it flows from the GPU 106 to the display 102, rather than after the entire frame is received from the GPU 106, minimizes latency. For example, the display controller 108 is simultaneously receiving new image pixels from the GPU 106 and writing converted image pixels to the display.

At operation 314, the display controller 108 causes presentation of the frame on the LCOS display. The display controller 108 causes the display 102 to display the frame by modulating a source of light, which illuminates the entire display panel. The display controller 108 causes each frame to be illuminated after the entire frame (i.e., each pixel of the frame) has been received by display and stored into the pixel cells.

Figure 4:
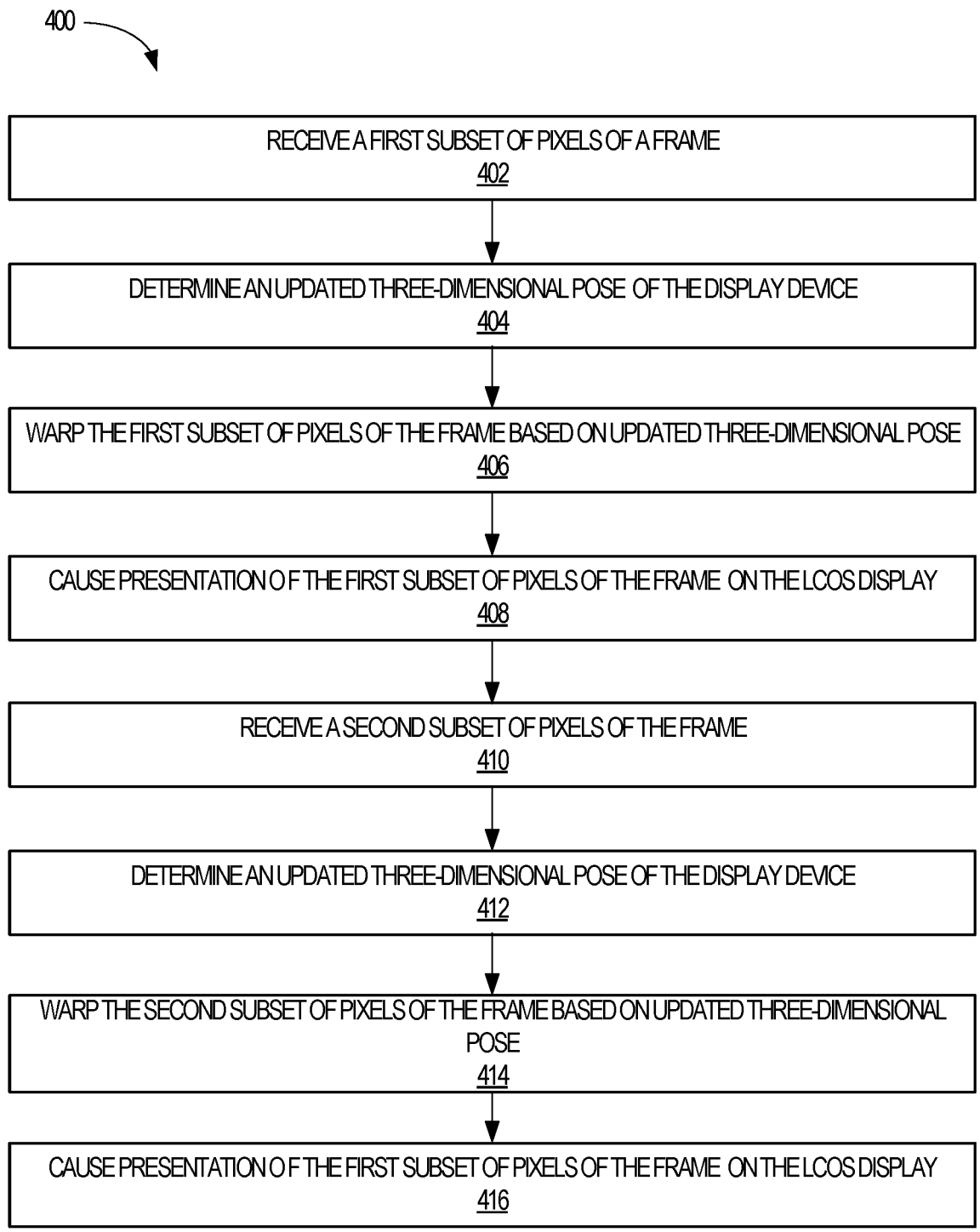
FIG. 4 is a flowchart showing a method for reducing latency when presenting AR content, according to some example embodiments.

FIG. 4 is a flowchart showing a method 400 for reducing latency when presenting AR content, according to some example embodiments. The method 400 may be embodied in computer readable instructions for execution by one or more computer processors such that the operations of the method 400 may be performed in part or in whole by the display controller 108; accordingly, the method 400 is described below by way of example with reference thereto. However, it shall be appreciated that at least some of the operations of the method 400 may be deployed on various other hardware configurations and the method 400 is not intended to be limited to the display controller 108.

At operation 402, the display controller 108 receives a first subset of pixels of a frame from a GPU 106. The GPU 106 renders the frame based on a three-dimensional pose of the display device 100. A display 102, such as an LCOS display, presents one color of pixels at a time. Accordingly, the GPU 106 splits each rendered frame into subsets of pixels that each include a single color of pixels (e.g., red, green, blue). The first subset of pixels of the frame includes pixels that are all of a single color.

At operation 404, the display controller determines an updated three-dimensional pose of the display device 100. For example, the sensor data gathering module 204 gathers updated sensor data from sensors 104 (e.g., accelerometer, gyroscope, IMU), and the updated three-dimensional pose determination module 206 uses the updated sensor data to determine the updated three-dimensional pose of the display device 100.

At operation 406, the warping module 208 warps the image pixels included in the first subset of pixels based on the updated three-dimensional pose. The warping module 208 warps the pixels as they are received from the GPU 106. This is in addition to converting the data format of the image pixels, as described above.

At operation 408, the presentation module 210 causes presentation of the first subset of pixels of the frame on the LCOS display 102. The presentation module 210 causes the display 102 to display the first subset of pixels of the frame by modulating a source of light, which illuminates the entire display panel. The presentation module 210 causes the first subset of pixels of the frame to be illuminated after the each of the pixels has been stored into the pixel cells of the display 102.

At operation 410, the display controller 108 receives a second subset of pixels of the frame from a GPU 106. The second subset of pixels of the frame includes pixels that are all of a single color that is different that the color of pixels in the first subset of the pixels of the frame. For example, the first subset includes only red pixels and the second subset includes only blue pixels.

At operation 412, the display controller determines an updated three-dimensional pose of the display device 100. For example, the sensor data gathering module 204 gathers updated sensor data from sensors 104 (e.g., accelerometer, gyroscope, IMU), and the updated three-dimensional pose determination module 206 uses the updated sensor data to determine the updated three-dimensional pose of the display device 100.

At operation 414, the warping module 208 warps the image pixels included in the second subset of pixels based on the updated three-dimensional pose. The warping module 208 warps the pixels as they are received from the GPU 106. This is in addition to converting the data format of the image pixels, as described above. Accordingly, the first subset of pixels and the second subset of pixels are warped based on different updated three-dimensional poses of the display device.

At operation 416, the presentation module 210 causes presentation of the second subset of pixels of the frame on the LCOS display 102. The presentation module 210 causes the display 102 to display the second subset of pixels of the frame by modulating a source of light, which illuminates the entire display panel. The presentation module 210 causes the second subset of pixels of the frame to be illuminated after the each of the pixels has been stored into the pixel cells of the display 102.

Software Architecture

Figure 5:
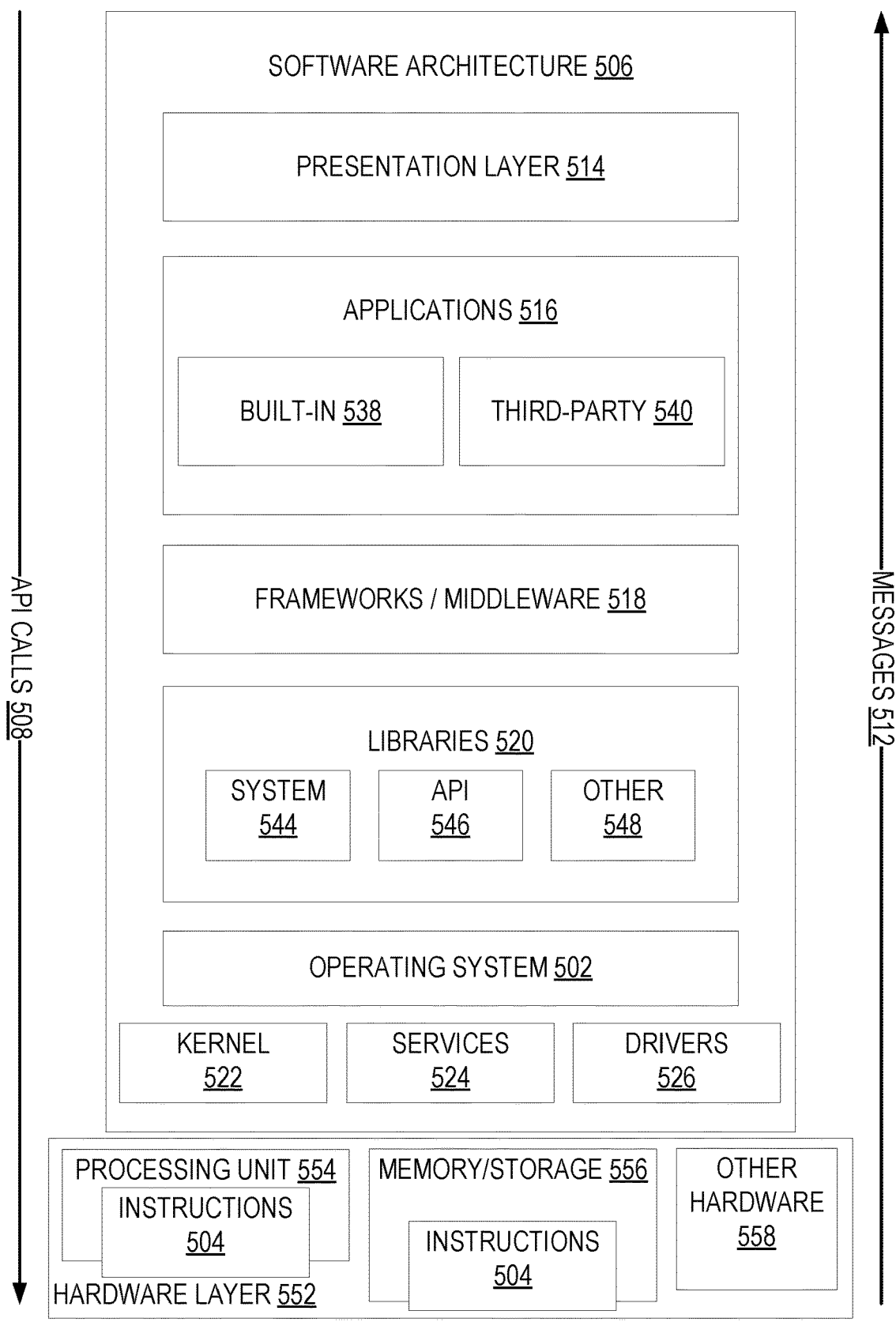
FIG. 5 is a block diagram illustrating a representative software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture 506 and it will be appreciated that many other architectures may be implemented to facilitate the functionality described herein. The software architecture 506 may execute on hardware such as machine 600 of FIG. 6 that includes, among other things, processors 604, memory 614, and (input/output) I/O components 618. A representative hardware layer 552 is illustrated and can represent, for example, the machine 600 of FIG. 6. The representative hardware layer 552 includes a processing unit 554 having associated executable instructions 504. Executable instructions 504 represent the executable instructions of the software architecture 506, including implementation of the methods, components, and so forth described herein. The hardware layer 552 also includes memory and/or storage modules memory/storage 556, which also have executable instructions 504. The hardware layer 552 may also comprise other hardware 558.

In the example architecture of FIG. 5, the software architecture 506 may be conceptualized as a stack of layers where each layer provides particular functionality. For example, the software architecture 506 may include layers such as an operating system 502, libraries 520, frameworks/middleware 518, applications 516, and a presentation layer 514. Operationally, the applications 516 and/or other components within the layers may invoke API calls 508 through the software stack and receive a response such as messages 512 in response to the API calls 508. The layers illustrated are representative in nature and not all software architectures have all layers. For example, some mobile or special purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 520 provide a common infrastructure that is used by the applications 516 and/or other components and/or layers. The libraries 520 provide functionality that allows other software components to perform tasks in an easier fashion than to interface directly with the underlying operating system 502 functionality (e.g., kernel 522, services 524 and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 (also sometimes referred to as middleware) provide a higher-level common infrastructure that may be used by the applications 516 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be used by the applications 516 and/or other software components/modules, some of which may be specific to a particular operating system 502 or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. Third-party applications 540 may include an application developed using the ANDROID®, IOS™, DAQRI®, Unity® or Unreal®, software development kit (SDK) by an entity other than the vendor of the particular platform, and may be mobile software running on a mobile operating system such as IOS®, ANDROID®, WINDOWS® Phone, or other mobile operating systems. The third-party applications 540 may invoke the API calls 508 provided by the mobile operating system (such as operating system 502) to facilitate functionality described herein.

The applications 516 may use built in operating system functions (e.g., kernel 522, services 524 and/or drivers 526), libraries 520, and frameworks/middleware 518 to create user interfaces to interact with users of the system. Alternatively, or additionally, in some systems, interactions with a user may occur through a presentation layer, such as presentation layer 514. In these systems, the application/component "logic" can be separated from the aspects of the application/component that interact with a user.

Figure 6:
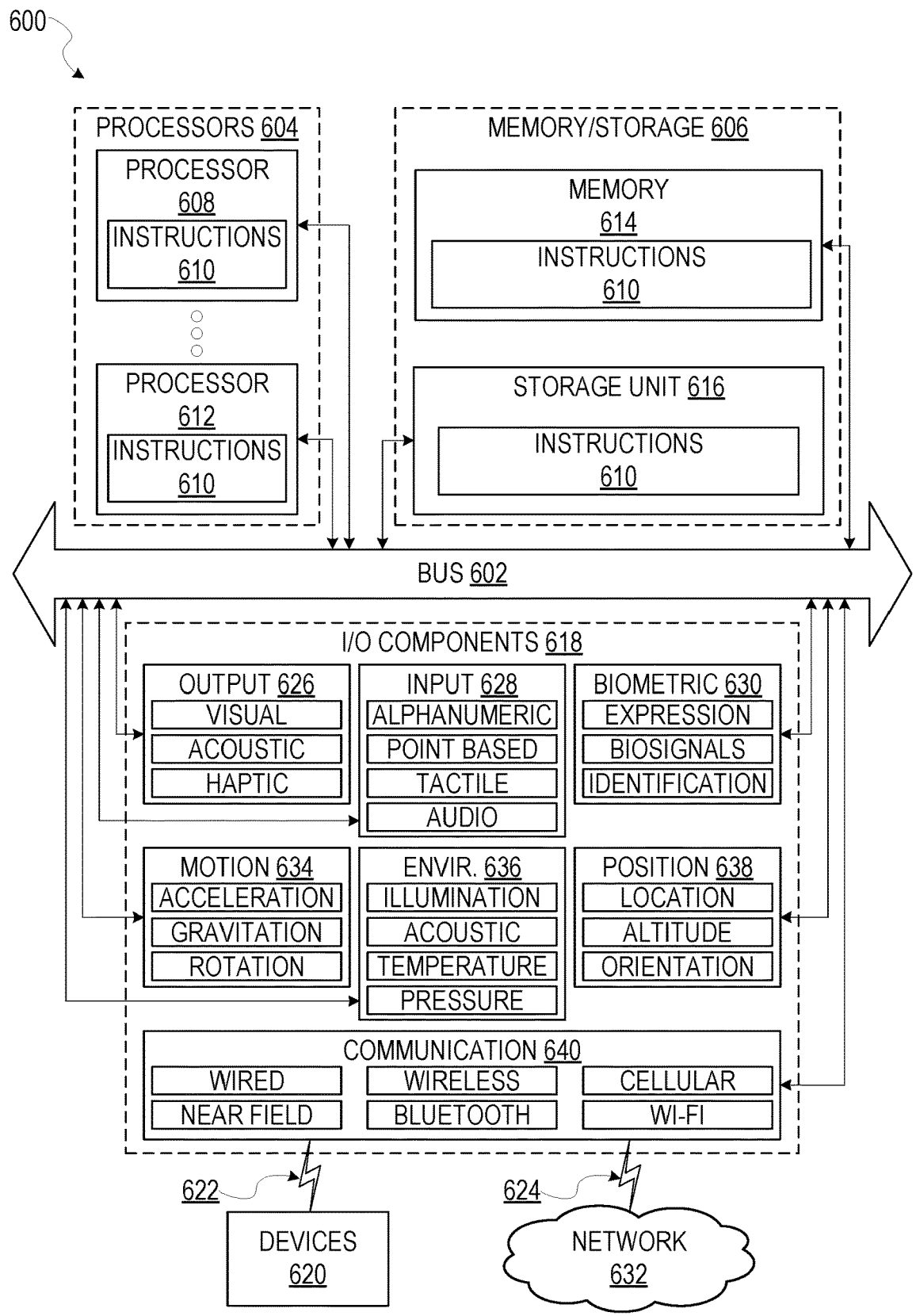
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 504 from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 600 capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, a cathode ray tube (CRT)), laser projectors with LCOS SLMs, laser beam scanning, OLED display, acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 624 and coupling 622, respectively. For example, the communication components 640 may include a network interface component or other suitable device to interface with the network 632. In further examples, communication components 640 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 610 for execution by the machine 600, and includes digital or analog communications signals or other intangible medium to facilitate communication of such instructions 610. Instructions 610 may be transmitted or received over the network 632 using a transmission medium via a network interface device and using any one of a number of well-known transfer protocols.

"CLIENT DEVICE" in this context refers to any machine 600 that interfaces to a communications network 632 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 632.

"COMMUNICATIONS NETWORK" in this context refers to one or more portions of a network 632 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 632 or a portion of a network 632 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 610 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 610. The term "machine-readable medium" shall also be taken to include any medium, or combination of multiple media, that is capable of storing instructions 610 (e.g., code) for execution by a machine 600, such that the instructions 610, when executed by one or more processors 604 of the machine 600, cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 604) may be configured by software (e.g., an application 516 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 604 or other programmable processor 604. Once configured by such software, hardware components become specific machines 600 (or specific components of a machine 600) uniquely tailored to perform the configured functions and are no longer general-purpose processors 604. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 604 configured by software to become a special-purpose processor, the general-purpose processor 604 may be configured as respectively different special-purpose processors (e.g., comprising different hardware components) at different times. Software accordingly configures a particular processor or processors 604, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 602) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 604 that are temporarily configured (e.g., by software) or permanently configured to perform the relevant operations. Whether temporarily or permanently configured, such processors 604 may constitute processor-implemented components that operate to perform one or more operations or functions described herein. As used herein, "processor-implemented component" refers to a hardware component implemented using one or more processors 604. Similarly, the methods described herein may be at least partially processor-implemented, with a particular processor or processors 604 being an example of hardware. For example, at least some of the operations of a method may be performed by one or more processors 604 or processor-implemented components. Moreover, the one or more processors 604 may also operate to support performance of the relevant operations in a "cloud computing" environment or as a "software as a service" (SaaS). For example, at least some of the operations may be performed by a group of computers (as examples of machines 600 including processors 604), with these operations being accessible via a network 632 (e.g., the Internet) and via one or more appropriate interfaces (e.g., an API). The performance of certain of the operations may be distributed among the processors 604, not only residing within a single machine 600, but deployed across a number of machines 600. In some example embodiments, the processors 604 or processor-implemented components may be located in a single geographic location (e.g., within a home environment, an office environment, or a server farm). In other example embodiments, the processors 604 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 600. A processor 604 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 604 (sometimes referred to as "cores") that may execute instructions 610 contemporaneously.

What is claimed is:

1. A method comprising:
receiving, by a display controller of a display device, a first stream of image pixels of a first frame of virtual content to be presented on a display of the display device, the first stream of image pixels received from a Graphics Processing Unit (GPU) that rendered the first frame based on an initial three-dimensional pose of the display device, the initial three-dimensional pose determined based on sensor data gathered by one or more sensors of the display device, the first stream of image pixels received by the display controller via a high-speed bulk interface that transfers data at least as fast as can be consumed by the display;
converting, by the display controller, each respective image pixel in the stream of image pixels as the respective image pixel is received from the GPU, each respective image pixel converted from a first data format used to transmit the first stream of image pixels via the high-speed bulk interface to a second data format that is compatible for display by the display, wherein each respective image pixel is converted without any portion of the first frame of virtual content being buffered by the display controller;
after each image pixel is converted into the second data format, storing the respective image pixel in one of a plurality of pixel cells of the display, wherein at least a first pixel of the first stream of pixels of the first frame is stored in a pixel cell of the display while a second pixel of the first stream of pixels of the first frame is being converted into the second data format by the display controller; and
in response to the first stream of image pixels of the first frame being converted into the second data format and stored in the pixel cells of the display, causing the display to present the first frame.

2. The method of claim 1, further comprising:
determining, based on updated sensor data, an updated three-dimensional pose of the display device;
determining a difference between the updated three-dimension pose of the display device and the initial three-dimensional pose of the display device; and
prior to storing each image pixel in a pixel cell of the display, warping the respective image pixels based on the difference between the initial three-dimensional pose and the updated three-dimension pose.

3. The method of claim 1, wherein the updated sensor data is gathered from an Inertial Measurement Unit (IMU) and includes at least gyroscope data indicating rotation of the display device.

4. The method of claim 1, wherein the high-speed bulk interface is Peripheral Component Interconnect (PCI) Express.

5. The method of claim 1, wherein the first stream of image pixels of the first frame includes a first subset of all image pixels of the first frame, the first subset of all image pixels of the first frame including only pixels in a first color.

6. The method of claim 5, further comprising:
receiving a second stream of image pixels of a first frame of virtual content to be presenting on the display, the second stream of image pixels of the first frame including a second subset of all image pixels of the first frame, the second subset of all image pixels of the first frame including only pixels in a second color that is different than the first color, the second stream of image pixels received from the GPU that rendered the first frame based on the initial three-dimensional pose of the display device;

as the second stream of image pixel is received, converting each respective image pixel from the first data format to the second data format;

after each image pixel is converted into the second data format, storing the respective image pixel in one of the plurality of pixel cells of the display; and in response to second stream of image pixels of the first frame being converted into the second data format and stored in the pixel cells of the display, causing the display to present the first frame.

7. The method of claim 6, further comprising:

determining, based on updated sensor data, an updated three-dimensional pose of the display device;

determining a difference between the updated three-dimension pose of the display device and the initial three-dimensional pose of the display device; and prior to storing each image pixel in a pixel cell of the display, warping the respective image pixels based on the difference between the initial three-dimensional pose and the updated three-dimension pose.

8. A display device comprising:

one or more computer processors; and one or more computer-readable mediums storing instructions that, when executed by the one or more computer processors, cause the display device to perform operations comprising:

receiving a first stream of image pixels of a first frame of virtual content to be presented on a display of the display device, the first stream of image pixels received from a Graphics Processing Unit (GPU) that rendered the first frame based on an initial three-dimensional pose of the display device, the initial three-dimensional pose determined based on sensor data gathered by one or more sensors of the display device, the first stream of image pixels received by the display controller via a high-speed bulk interface that transfers data at least as fast as can be consumed by the display;

converting each respective image pixel in the stream of image pixels as the respective image pixel is received from the GPU, each respective image pixel converted from a first data format used to transmit the first stream of image pixels via the high-speed bulk interface to a second data format that is compatible for display by the display, wherein each respective image pixel is converted without any portion of the first frame of virtual content being buffered by the display controller;

after each image pixel is converted into the second data format, storing the respective image pixel in one of a plurality of pixel cells of the display, wherein at least a first pixel of the first stream of pixels of the first frame is stored in a pixel cell of the display while a second pixel of the first stream of pixels of the first frame is being converted into the second data format by the display controller; and in response to the first stream of image pixels of the first frame being converted into the second data format and stored in the pixel cells of the display, causing the display to present the first frame.

9. The display device of claim 8, the operations further comprising:

determining, based on updated sensor data, an updated three-dimensional pose of the display device;

determining a difference between the updated three-dimension pose of the display device and the initial three-dimensional pose of the display device; and prior to storing each image pixel in a pixel cell of the display, warping the respective image pixels based on the difference between the initial three-dimensional pose and the updated three-dimension pose.

10. The display device of claim 8, wherein the updated sensor data is gathered from an Inertial Measurement Unit (IMU) and includes at least gyroscope data indicating rotation of the display device.

11. The display device of claim 8, wherein the high-speed bulk interface is Peripheral Component Interconnect (PCI) Express.

12. The display device of claim 8, wherein the first stream of image pixels of the first frame includes a first subset of all image pixels of the first frame, the first subset of all image pixels of the first frame including only pixels in a first color.

13. The display device of claim 12, the operations further comprising:

receiving a second stream of image pixels of a first frame of virtual content to be presenting on the display, the second stream of image pixels of the first frame including a second subset of all image pixels of the first frame, the second subset of all image pixels of the first frame including only pixels in a second color that is different than the first color, the second stream of image pixels received from the GPU that rendered the first frame based on the initial three-dimensional pose of the display device;

as the second stream of image pixel is received, converting each respective image pixel from the first data format to the second data format;

after each image pixel is converted into the second data format, storing the respective image pixel in one of the plurality of pixel cells of the display; and in response to second stream of image pixels of the first frame being converted into the second data format and stored in the pixel cells of the display, causing the display to present the first frame.

14. The display device of claim 13, operations further comprising:

determining, based on updated sensor data, an updated three-dimensional pose of the display device;

determining a difference between the updated three-dimension pose of the display device and the initial three-dimensional pose of the display device; and prior to storing each image pixel in a pixel cell of the display, warping the respective image pixels based on the difference between the initial three-dimensional pose and the updated three-dimension pose.

15. A non-transitory computer-readable medium storing instructions that, when executed by one or more computer processors of a display controller of a display device, cause the display controller to perform operations comprising:

receiving a first stream of image pixels of a first frame of virtual content to be presented on a display of the display device, the first stream of image pixels received from a Graphics Processing Unit (GPU) that rendered the first frame based on an initial three-dimensional pose of the display device, the initial three-dimensional pose determined based on sensor data gathered by one or more sensors of the display device, the first stream of image pixels received by the display controller via a high-speed bulk interface that transfers data at least as fast as can be consumed by the display;

converting each respective image pixel in the stream of image pixels as the respective image pixel is received from the GPU, each respective image pixel converted from a first data format used to transmit the first stream of image pixels via the high-speed bulk interface to a second data format that is compatible for display by the display, wherein each respective image pixel is converted without any portion of the first frame of virtual content being buffered by the display controller;

after each image pixel is converted into the second data format, storing the respective image pixel in one of a plurality of pixel cells of the display, wherein at least a first pixel of the first stream of pixels of the first frame is stored in a pixel cell of the display while a second pixel of the first stream of pixels of the first frame is being converted into the second data format by the display controller; and in response to the first stream of image pixels of the first frame being converted into the second data format and stored in the pixel cells of the display, causing the display to present the first frame.

16. The non-transitory computer-readable medium of claim 15, the operations further comprising:

determining, based on updated sensor data, an updated three-dimensional pose of the display device;

determining a difference between the updated three-dimension pose of the display device and the initial three-dimensional pose of the display device; and prior to storing each image pixel in a pixel cell of the display, warping the respective image pixels based on the difference between the initial three-dimensional pose and the updated three-dimension pose.

17. The non-transitory computer-readable medium of claim 15, wherein the updated sensor data is gathered from an Inertial Measurement Unit (IMU) and includes at least gyroscope data indicating rotation of the display device.

* * * * *

UNITED STATES PATENT AND TRADEMARK OFFICE
CERTIFICATE OF CORRECTION

Page 1 of 1

PATENT NO. : 10,714,050 B2
APPLICATION NO. : 15/927187
DATED : July 14, 2020
INVENTOR(S) : Wagner et al.

It is certified that error appears in the above-identified patent and that said Letters Patent is hereby corrected as shown below:

In the Claims

In Column 22, Line 42, in Claim 14, before "operations", insert --the--

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*